Figure 1:
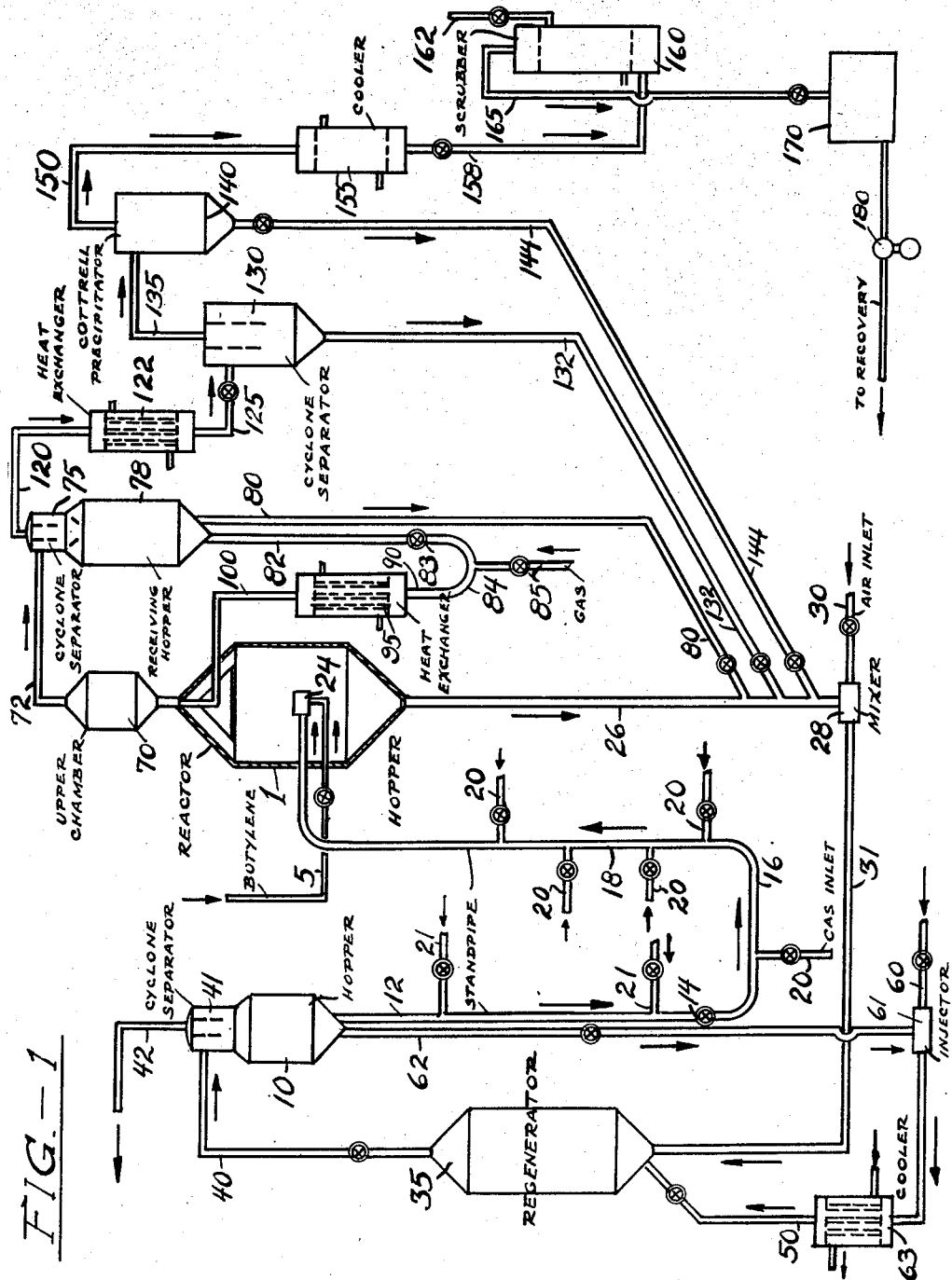

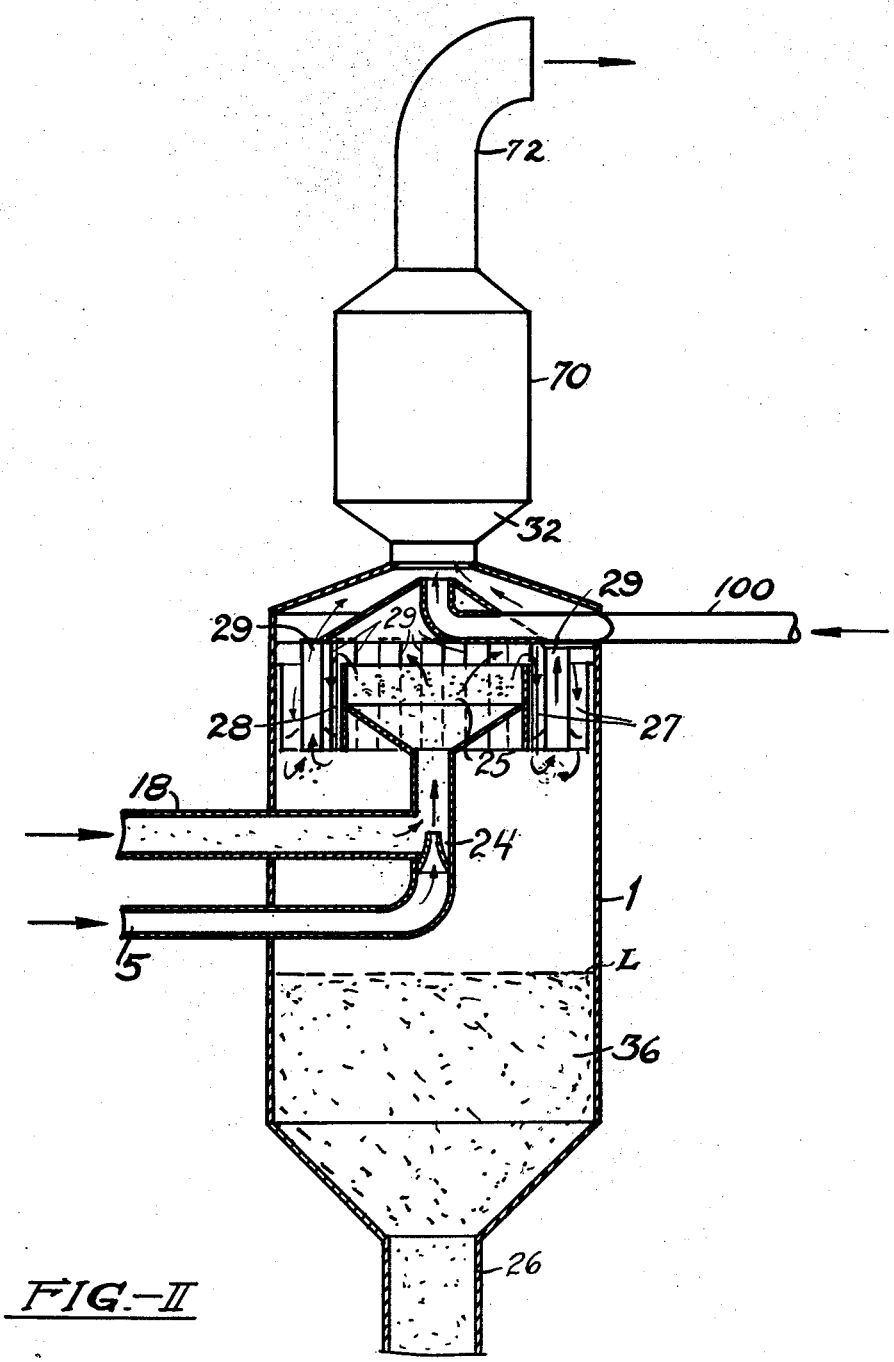

Patented May 15, 1945

2,376,190

UNITED STATES PATENT OFFICE 2,376,190

CHEMICAL PROCESS

Bruno E. Roetheli, Cranford, and Walter G. Scharmann, Westfield, N. J., assignors, by mesne assignments, to Jasco, Incorporated, a corporation of Louisiana Application August 20, 1941, Serial No. 407,550

6 Claims. (Cl. 196—52)

The present invention relates to improvements in the art of controlling the time or duration of a chemical reaction accurately within narrow limits by quenching the reaction mass with a cooler solid substance.

There are a number of chemical reactions in which the time or duration of the reaction is of the essence. For example, in the catalytic dehydrogenation of hydrocarbons, such as the dehydrogenation of butylene to form butadiene, it is known that the optimum contact time between catalyst and reaction mass at reaction temperatures is of the order of less than one second at subatmospheric pressures. In contact times of the order indicated, the production of butadiene is at a maximum and the formation of undesired decomposition products is at a minimum.

In operating with a fixed bed of catalyst, that is to say, in operating a process in which the reaction gases pass through a body of catalyst in the form of pellets or lumps, it is extremely difficult by any feasible method to limit the contact times to the degree indicated above, namely, to a fraction of a second. In any event, it is difficult to maintain all portions of reaction mixture in contact with the catalyst for such a short period of time because appreciable time is consumed by those molecules of the reactants which diffuse into the aggregates of catalyst particles of the size employed in fixed beds, and are released therefrom. In other words, while those molecules which contact merely the surface of the catalyst pills or pellets may be subjected to the influence of catalyst for a relatively short period of time, those molecules which actually penetrate into the body of catalyst are in contact with the catalyst for a period of time which is usually sufficient to cause the formation of undesired products with a consequent loss in yield of the desired products.

In order to overcome the foregoing and similar disadvantages, we have devised means for limiting chemical reactions carried out catalytically to short periods of contact time between catalyst and reactant, and we accomplish this end essentially by quenching the reaction mixture with catalyst which is cooler than the said mixture.

The main object of our invention is to control contact time between a gaseous reactant and a catalyst for the reaction by the use of finely divided catalyst and quenching the reaction when the equilibrium is most favorable for the desired product by adding cooled catalyst to the reaction mass.

Another important step in our invention is to feed catalyst to the reaction zone by means of an up-flow standpipe, the details of which will be more fully described hereinafter.

A further object of our invention is to provide a process and suitable means therefor, whereby we may continuously perform vapor phase reaction in the presence of a powdered catalyst, provide means for regenerating the catalyst, and provide other means for returning the regenerated catalyst to the reaction zone to maintain continuity of operation, optimum temperature and pressure conditions, and, finally, provide optimum contact times between reactant and catalyst at reaction temperatures.

In order to illustrate our invention and for the purpose of disclosing more fully its nature and purpose, we have shown in the accompanying drawings diagrammatically, a form and arrangement of apparatus elements in which our invention may be applied to butylene dehydrogenation. Thus, in Fig. I we have shown a complete flow diagram which discloses in connection with the specification, a preferred modification of our invention; and in Fig. II there is shown an enlarged view of our improved reactor. Throughout the views similar reference characters refer to similar parts.

Referring in detail to the drawings, 1 represents a hopper in which the reaction takes place. The internal construction of our improved reactor is shown in detail in Fig. II and will be subsequently described in detail in discussing that figure of the drawings. Catalyst in the form of powder having a particle size of from 200–400 mesh is also discharged into the reactor from another hopper 10 in a manner that will be presently explained. The hopper 10 contains a dehydrogenation powdered catalyst preferably in a heated and activated condition and is in communication at its lower end with a standpipe 12 projecting downwardly as shown. This pipe may be of any convenient dimension, such as 36 inches in internal diameter, and a vertical length of 40–60 ft. These dimensions are purely illustrative and are governed by the quantity of catalyst to be fed to the hopper in any particular case. The lower end of the pipe is provided with a control valve 14 which is adapted to control the rate of flow by gravity of powder in pipe 12 into the horizontal bend 16. Horizontal bend 16 is in communication with upwardly extending standpipe 18 which projects, as shown, into hopper 1. In other words, the feed of catalyst to the hopper 1 is through a down-flow pipe 12 and an up-flow standpipe 18. This flow may be accomplished by regulating the densities in pipes 12 and 18, respectively, by selecting the proper pipe dimensions, coupled with the introduction of fluidizing gas as follows. First, to cause catalyst to flow freely in pipe 12 a fluidizing gas is injected therein through pipes 21. By the same token to fluidize the catalyst in pipe 18, gas is injected through pipes 20. It is deemed obvious that by making pipe 18 of smaller internal diameter than pipe 12, the gas velocity in pipe 18 will be greater than that in pipe 12 and hence the density in pipe 18 will be less. Hence, catalyst will flow by the means indicated in the indicated direction. It is to be understood that the amount of gas injected into pipe 12 is much less than that injected into pipe 18, say one-fourth as much or less.

There is also discharged into the reactor a quantity of butylene, this material being supplied through line 5. The catalyst and the butylene are mixed in mixing device 24, and the mixture is then caused to flow upwardly in the hopper reactor. The temperature of the gas in line 5 entering the reactor is about 1000° F., while the catalyst in line 18 is at a temperature of about 1350° F. The gas and catalyst are mixed in proportions such that the temperature of the mixture is about 1250° F., with most catalysts and we prefer to maintain a density of the suspension in the region just above the mixing device 24 of from about 15–25 lbs./cu. ft. which condition is attained by regulating the gas velocities between 2 and 10 ft. per second where the particle catalyst size is from 200–400 mesh. Also a gas pressure of about 190 mm. of mercury is preferred within the reactor in the reaction now in question. Under the conditions stated, the reaction occurs to form ordinarily, butadiene from normal-butylene, and then by means which will be subsequently explained more fully hereinafter, the bulk of catalyst is separated from the reaction mass and gravitates from the bottom of the reactor from which it is withdrawn through standpipe 26, mixed with air in a mixing device 28, the air entering through line 30, and thence conveyed through pipe 31 into a regenerator 35. The dimensions of regenerator 35 and the gas velocities are such dimensions that when the catalyst is mixed with the required amount of air or other free oxygen containing gas, the density of the mixture is from about 20 to 25 lbs./cu. ft. The catalyst in line 26 is at a temperature of 1150° F.–1250° F., and under these conditions when mixed with air at ordinary atmospheric temperature in mixer 28 active combustion takes places in regenerator 35 with the consumption of carbonaceous deposits produced on the catalyst as a result of the reaction taking place in reactor 1. Ordinarily it is preferable to operate regenerator 35 under superatmospheric pressure, say pressures up to 1–5 lbs./sq. in. gauge or higher, as dictated by economic considerations, in order to accelerate the oxidation of the contaminating carbonaceous material. The flue gas and the regenerated catalyst are withdrawn from regenerator through line 40 and discharged into a cyclone separator 41 built into the top of hopper 10. The separator effects separation of the regenerated catalyst from the flue gas, and the latter is withdrawn through line 42 and, if desired, sent to a second cyclone separator to remove further quantities of catalyst. In some cases, it is desirable to employ three cyclones or even more to insure complete removal and recovery of catalyst from flue gas. The hot flue gases substantially freed of catalyst may then be passed through a waste heat boiler to recover a portion of their energy content. The catalyst separated in cyclone separator 41 gravitates into hopper 10 and is recycled to the reactor in the manner previously described.

In the drawing, we have shown means for controlling the regeneration temperature of the catalyst in regenerator 35. As shown, catalyst, that is regenerated catalyst, may be withdrawn through hopper 10 through line 62, mixed with air from line 60 in injector 61, thence discharged through cooler 63 and line 50 into regeneration vessel 35. The cooled regenerated catalyst may be at a temperature of say 300–500° F. as it enters the regenerator, and may be in the proportions of say 1/30–2 or more parts by weight of regenerated catalyst per part of unregenerated catalyst. The cooler regenerated catalyst serves to increase the heat capacity of the mixture and temper the exothermic reaction by adsorbing heat released during regeneration.

Referring again to reactor 1, it will be noted that a second chamber 70 is superimposed at the top of reactor. This chamber contains the reaction products and catalyst added to quench the reaction mixture. The manner of adding the catalyst will be presently described, but first let it be observed that the newly added catalyst plus the remainder of the original catalyst not separated, together with the reaction mass, are withdrawn overhead through line 72 and passed into a cyclone separator 75 where the bulk of the quenching catalyst and the catalyst not previously removed are separated from the vapors. The separated catalyst passes into a receiving hopper 78 and in this hopper is at a temperature of about 1050° F. One stream of catalyst is withdrawn from hopper 78 through line 80, communicating in its lower end with standpipe 25, as shown. The other stream of catalyst is withdrawn through line 82 carrying a flow control valve 83 at its lower end and thence discharged into bend 84 where it is mixed with a gas such as methane discharged into 84 through pipe 85, and thereafter the catalyst is passed upwardly through line 90 through a heat exchanger 95 where the catalyst is cooled to a temperature such that when withdrawn through line 100 it is at a temperature of about 600° F., whereupon it is injected into reaction mass in reactor 1 and thereafter carried upwardly in suspension into quenching chamber 70 previously mentioned. The amount of catalyst recycled from hopper 78 to quenching chamber 70 will depend of course entirely on the amount of gas and catalyst flowing into chamber 70 and the temperature thereof. We have found that good results are obtained by recycling to zone 70 from hopper 78 sufficient catalyst so that a temperature of 1000°–1050° F. prevails in chamber 70. In any event, it is usually preferable to add sufficient catalyst to lower the temperature of the reaction mass to about 1000° F. or lower because at this temperature undesired side reactions are prevented and the decomposition of the desired butadiene is substantially prevented. The gases freed from catalyst in separator 75 are withdrawn through line 120 and these are preferably passed through a heat exchanger 122 where they are cooled to about 600° F., thence withdrawn through line 125 and passed into Cottrell precipitator 130 where a catalyst is separated and recycled to line 25 through line 132. The gases are drawn overhead from separator 130 through line 135 and pass through a Cottrell precipitator 140 where more catalyst is separated out and the separated catalyst is withdrawn through line 144 and recycled through line 31 to regenerator 35. The reaction products now containing only minor amounts of catalyst are withdrawn from Cottrell precipitator through line 150, thence further cooled in cooler 155, thence discharged through line 158 into an oil washer 160 where the last traces of catalyst are removed, the scrubbing oil being discharged into the washer through line 162. The washed gases are withdrawn through line 165, passed through entrainment separator 170 and thence to a pump in which they are compressed and condensed prior to separation in a suitable system. The pressure conditions, i. e., the partial vacuum previously referred to in reactor 1 is maintained through pump 180 and suitable valves, in known manner.

Referring now to Fig. II for a detailed description of our improved reactor and its immediate accessory apparatus, it will be observed that the catalyst and the butylene enter the reaction vessel 1 and pass into the mixing chamber 24 and thence are delivered into the reaction chamber 25 where the main reaction takes place, the catalyst being in the form of a dense mass or phase thoroughly intermixed with the reactant. Disposed about the reaction chamber 25 are a plurality of cyclone separators 28. These separators are arranged contiguously in the form of a ring or circle about the reaction vessel, and in escaping from reaction vessel 25 the fluidized mass and reactant gas are forced into the separators 28. The bulk of the catalyst, usually over 90%, is separated from the gases and gravitates to the bottom portion 36 of the reaction vessel, while the gases flow upwardly through outlet pipes 29, thence through pipe 32 into quenching chamber 70. The catalyst which is separated in the separators 27 collects in the bottom of the reaction vessel, as indicated by the catalyst level line L, and is withdrawn from the said reactor and arranged such as to maintain the heated catalyst continuously in the said reaction vessel.

As is known by those familiar with this particular art, the types of catalyst which may be employed for dehydrogenations are many and varied. One of these catalysts is metallic nickel. Heretofore the difficulty with metallic nickel has been that it is so reactive that it is not usable because it not only accelerates the formation of, say, butadiene from butylene but attacks the butadiene to decompose it. In the type of operation which we have described herein, a very active catalyst such as nickel may be successfully employed because the combination of controlled contact time, finely divided catalyst and quenching features enables us to discontinue the reaction and to limit it to a very short period of time of contact between reactants and the nickel at reaction temperatures. In the case of other catalysts such as silica-alumina compositions, alumina-tungsten, alumina-chromium, alumina-molybdenum, the various metallic oxides, and the like, such as copper oxide, nickel oxide, cobalt oxide or mixtures of the same where the catalyst is less active, our process is also of value not only from the standpoint of quenching the reaction but also from the standpoint of supplying at least a portion of the heat necessary for the reaction by recycling hot regenerated catalyst to the reaction zone.

To recapitulate, our present invention involves the concept of controlling accurately the contact time between a gaseous reactant and a solid catalyst, and while we have described the invention in detail in connection with the specific problem of dehydrogenating an olefin, obviously the inventive concept is applicable to a great number of processes, such as gas oil cracking, desulfurization, aromatization, oxidations, simple and destructive hydrogenations, chlorinations, and numerous other gas phase reactions where contact time is an important consideration from the standpoint of yields or for other reasons. It will be noted that according to our process, we prefer to quench the reaction mass by means of a cooled solid, such as a solid catalyst added in sufficient quantity to lower the reaction mass to temperatures substantially below reaction temperatures, and since the process may be operated to quench the catalyst within the reaction zone very short contact times may be effected. On the other hand, if longer contact time between reactant and catalyst is desired, the quenching may be formed in a subsequent stage, say by adding cooled catalyst in line 72. It will be understood that instead of using catalyst to quench the reaction mass, we may use an inert solid such as sand, line, or refractory material which is added in sufficient quantity and at a sufficiently lower temperature to effect the desired result.

Other features of our invention involve, as heretofore set forth, an up-flow standpipe arrangement for adjusting pressure differentials between the reaction zone and the regeneration zone; another feature involves furnishing at least a portion of the heat required for endothermic reactions by supplying the proper amount of heated catalyst. Finally, the catalyst flowing in the various means may be fluidized by steam as heretofore mentioned, or by the introduction of other gases such as methane, $CO_2$, CO, nitrogen, and the like; that is to say, these gases may be added through lines 60 and 20 and at other points in the system heretofore mentioned, to attain the desired fluidity of catalyst.

The pressure in reactor 1 may vary from about 100 mm. of mercury to above atmospheric pressure, subatmospheric pressure being preferred.

Many modifications of our invention will be obvious to those skilled in this particular art.

What we claim is:

1. In the process of reacting gasiform reactants in the presence of a powdered catalyst suspended in a reactant, the improvement which comprises feeding the catalyst upwardly through a conduit of restricted cross sectional area aided by a fluidizing gas to a reaction zone of reduced pressure, mixing the reactant with the fluidized catalyst in a mixing zone, and controlling the time of contact between reactant and catalyst at reaction temperatures by discharging into the reacted mass a quantity of cooled catalyst shortly after the original contact.

2. The process set forth in claim 1 in which the reactant is maintained at reaction temperature in the presence of the catalyst for a period of less than one second.

3. The process set forth in claim 1 in which the reaction is endothermic in nature.

4. The process set forth in claim 1 in which the reaction is endothermic in nature and at least a portion of the superheat necessary for the reaction is supplied by mixing the reactant with hot catalyst in the mixing zone.

5. An improved process for dehydrogenating hydrocarbons which comprises passing separate streams of highly heated catalyst, in fluidized powdered form, and a cooler hydrocarbon reactant through a reaction zone in which the cross sectional area is large compared with its length, adding a cool stream of fluidized catalyst at the outlet of the reaction zone whereby the reaction mixture is cooled rapidly and a short time of reaction is provided, then separating the catalyst from the dehydrogenated product.

6. The method of controlling chemical reactions conducted in vapor phase in the presence of a powdered catalyst which comprises charging gasiform reaction products containing a powdered catalyst and heated to active reaction temperatures to a reaction zone, permitting reactants to flow through said reaction zone in contact with the catalyst at active reaction temperatures whereby the desired conversion takes place and limiting the duration of the time period in which the reactants are maintained at active reaction temperatures by adding to the reaction products a sufficient quantity of cooled catalyst to cause the temperature of the reactants to be sufficiently lowered to prevent undesired side reactions, the cooled catalyst being added at a point in close proximity to the point where the reactants are about to leave the reaction zone, withdrawing the reaction products containing catalyst from the reaction zone, separating the catalyst from the reaction products and recovering the desired product.

BRUNO E. ROETHELI.
WALTER G. SCHARMANN.